United States Patent
Acosta

(10) Patent No.: US 7,255,278 B2
(45) Date of Patent: *Aug. 14, 2007

(54) DENSE PATTERN OPTICAL SCANNER

(75) Inventor: Jorge L. Acosta, Eugene, OR (US)

(73) Assignee: Datalogic Scanning, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,582

(22) Filed: Oct. 7, 2005

(65) Prior Publication Data

US 2006/0032925 A1    Feb. 16, 2006

Related U.S. Application Data

(63) Continuation of application No. 10/606,119, filed on Jun. 24, 2003, now Pat. No. 6,994,265, which is a continuation of application No. 09/650,882, filed on Aug. 30, 2000, now Pat. No. 6,585,161.

(51) Int. Cl.
    *G06K 7/10*    (2006.01)
(52) U.S. Cl. .......................... 235/462.14; 235/462.07; 235/462.15; 235/462.35
(58) Field of Classification Search ................ 902/22; 235/462.14, 462.07, 462.08, 462.17; 905/414
    See application file for complete search history.

(56) References Cited

U.S. PATENT DOCUMENTS

| | | | |
|---|---|---|---|
| 4,591,242 A | 5/1986 | Broockman et al. | 350/3.71 |
| 4,786,798 A | 11/1988 | Lonsdale | 250/216 |
| 5,115,888 A * | 5/1992 | Schneider | 186/61 |
| 5,168,149 A | 12/1992 | Dvorkis et al. | 235/472 |
| 5,174,399 A * | 12/1992 | Brauneis | 177/25.15 |
| 5,206,491 A | 4/1993 | Katoh et al. | 235/467 |
| 5,229,588 A | 7/1993 | Detwiler et al. | 235/467 |
| 5,361,158 A | 11/1994 | Tang | 359/204 |
| 5,457,308 A | 10/1995 | Spritz et al. | 235/462 |

(Continued)

FOREIGN PATENT DOCUMENTS

GB    2255650    11/1992

(Continued)

OTHER PUBLICATIONS

Book, entitled, *High Collection Nonimaging Optics*, by W.T. Welford and R. Winston, copyright 1989 by Academic Press, Inc.

*Primary Examiner*—Seung Ho Lee
(74) *Attorney, Agent, or Firm*—Stoel Rives LLP

(57) ABSTRACT

A method of and a system for generating a dense pattern of scan lines. In a preferred configuration, a laser beam is directed into an inline beam dithering mechanism which dithers the beam over an angle parallel to the axis of rotation of the rotating facet wheel. The combination of the dithering mechanism and the scanning motion of the rotating facet wheel creates a dense scan pattern. Return light is retrodirectively collected by a collection element such as a collection lens onto a detector. A beam redirector such as a cone-shaped device having openings on both ends and a reflecting internal surface is disposed between the collection lens and the detector to redirect off-axis spot onto the detector. The system and method is applicable to both single and multiple beam systems and single and multiple window scanners.

9 Claims, 12 Drawing Sheets

U.S. PATENT DOCUMENTS

| | | | |
|---|---|---|---|
| 5,475,207 A | 12/1995 | Bobba et al. | 235/467 |
| 5,491,328 A | 2/1996 | Rando | 235/462 |
| 5,532,480 A | 7/1996 | Scofield | 235/462 |
| 5,565,668 A | 10/1996 | Reddersen et al. | 235/462 |
| 5,596,442 A | 1/1997 | Plesko | 359/199 |
| 5,668,362 A | 9/1997 | Plesko | 235/467 |
| 5,693,930 A | 12/1997 | Katoh et al. | 235/467 |
| 5,719,385 A | 2/1998 | Wike, Jr. et al. | 235/467 |
| 5,839,104 A * | 11/1998 | Miller et al. | 704/251 |
| 5,841,121 A | 11/1998 | Koenck | 235/472 |
| 5,869,827 A | 2/1999 | Rando | 235/462.4 |
| 5,870,219 A | 2/1999 | Plesko | 359/199 |
| 5,929,421 A | 7/1999 | Cherry et al. | 235/462.12 |
| 5,936,218 A | 8/1999 | Ohkawa et al. | 235/462 |
| 5,945,670 A | 8/1999 | Rudeen | 250/235 |
| 5,975,418 A | 11/1999 | Ishii et al. | 235/462.37 |
| 5,988,508 A | 11/1999 | Bridgelall et al. | 235/462.4 |
| 6,000,619 A | 12/1999 | Reddersen et al. | 235/462.45 |
| 6,152,372 A | 11/2000 | Colley et al. | 235/472.01 |
| 6,188,500 B1 | 2/2001 | Rudeen et al. | 359/196 |
| 6,290,135 B1 | 9/2001 | Acosta et al. | 235/472.01 |
| 6,297,739 B1 | 10/2001 | Small | 340/573.3 |
| 6,318,634 B1 | 11/2001 | Svetal et al. | 235/462.4 |
| 6,585,161 B1 | 7/2003 | Acosta | 235/462.4 |
| 2003/0085284 A1* | 5/2003 | Bremer et al. | 235/462.32 |

FOREIGN PATENT DOCUMENTS

| | | |
|---|---|---|
| WO | WO 00/11447 | 3/2000 |

* cited by examiner

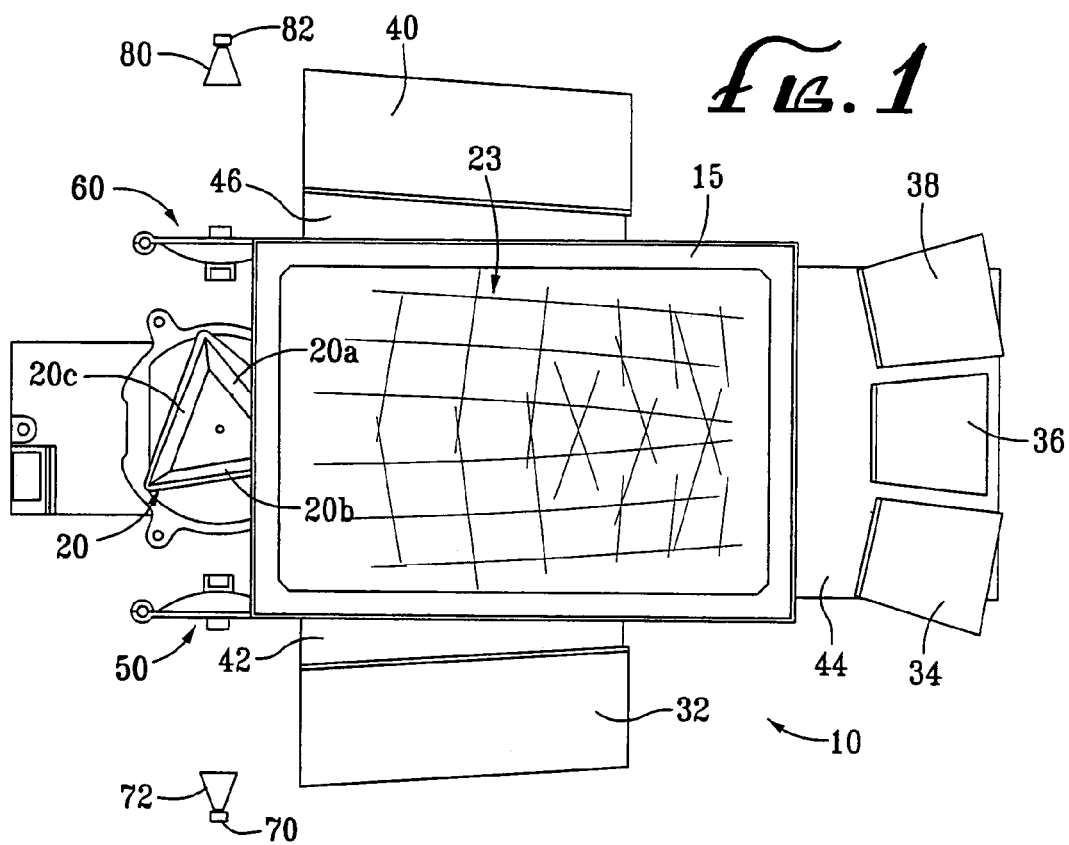
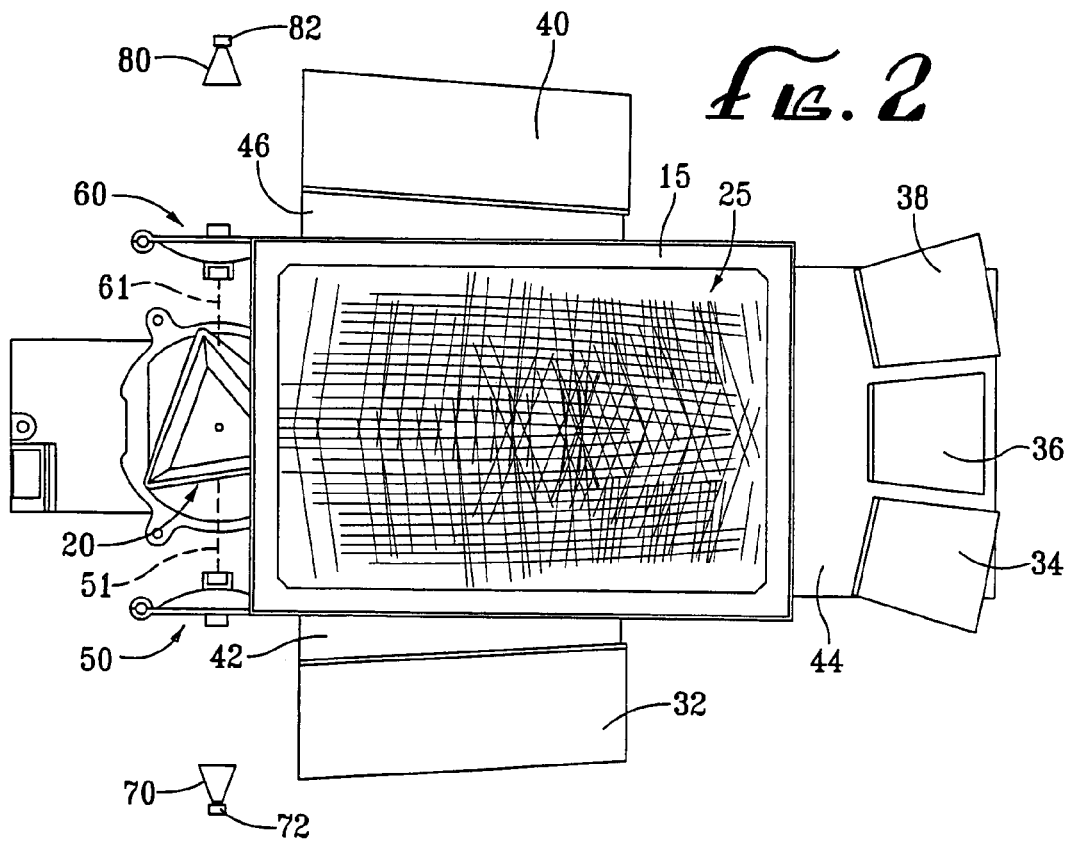

DENSE PATTERN OPTICAL SCANNER

RELATED APPLICATION DATA

This application is a continuation of application Ser. No. 10/606,119 filed Jun. 24, 2003 now U.S. Pat. No. 6,994,265 which is a continuation of application Ser. No. 09/650,882 filed Aug. 30, 2000, U.S. Pat. No. 6,585,161.

BACKGROUND

The field of the present invention relates to data reading systems. In particular, optical scanning systems and methods for optical scanning are described herein for creating a dense scan pattern. Certain preferred embodiments are especially suitable for use as a fixed scanner such as that employed at a supermarket checkout counter reading bar codes such as those found on consumer products.

For effective and accurate performance, a bar code scanner depends upon focused optics and scanning geometry. Fixed scanners frequently employ a rotating polygon mirror which directs a scanning beam toward a mirror array for generating a desired scan pattern. One type of fixed bar code scanner positions a scan engine in a base with a scan window oriented in a horizontal plane. One such scanning system is disclosed in U.S. Pat. No. 5,073,702 in which a scanning beam is reflected off a mirror array which has a plurality of mirrors arranged in a generally semicircular pattern. The scanning beam reflecting off each of the mirrors has vertically upward component thereby passing through the window/aperture. Objects to be scanned are passed over the window with the bar codes oriented in a generally downward direction.

In another scanner orientation, the scan engine is housed in a vertical tower with the scan window oriented in a vertical plane. In such a vertical scanner, generally all the outgoing scan beams come out sidewards also have an upward vertical component. Objects to be scanned are passed in front of the window with the bar codes oriented in a generally sideward direction.

In order to produce a successful scan, an object must be oriented with its bar code passed in front of the scan window at an angle which is not so oblique as to prevent a scan line from striking or "seeing" the bar code. Therefore to achieve a successful scan, the user must position the object with the bar code placed sufficiently close to the desired orientation. The range of suitable plane orientation of the object bearing the bar code is limited by the size of the window and the angle over which the mirror array can direct a scan pattern. Present vertical scanners can scan bar codes oriented on certain lateral sides (i.e., side facing) which face the vertical window, but experience difficulties in scanning faces oriented in a horizontal plane (i.e., facing up or down) or lateral sides opposite the window. Horizontal scanners (i.e., upward facing) are fairly adept at scanning the bottom side but are frequently limited as to which lateral sides may be scanned.

U.S. Pat. No. 5,475,207 (Bobba, Acosta et al.) discloses a variety of single and multiple source laser scanners, and single and multiple scan mechanisms for creating relatively dense scan patterns through multiple scan housing windows. A commercial embodiment of one of the scanners disclosed in the U.S. Pat. No. 5,475,207 is the Magellan® scanner sold by PSC Inc. of Eugene, OR.

These scanners generally rely on the number of facets in the polygon mirror and the number of pattern mirrors to generate a certain number of scanning segments or scan lines. The number of pattern mirrors is limited by the size of the scanner housing. The present inventor has undertaken to overcome this limitation as disclosed in Acosta U.S. application Ser. No. 09/360,039 filed Jul. 23, 1999 U.S. Pat. No. 6,290,135 wherein multiple laser beams are directed along parallel paths onto the polygon mirror for creating additional scan lines.

SUMMARY

The present invention is directed to systems for and methods of reading items being passed through or placed in a read zone. A preferred embodiment is directed to a system and method of efficiently generating a dense pattern of scan lines. In a preferred configuration, a laser beam is dithered before being directed onto a scanning mechanism, such as a polygon mirror, which scans the beams across pattern mirrors to generate a higher density scan pattern out into the scan volume. Return light reflecting off an object being scanned is retrodirectionally collected and directed by a collection element such as a collection lens toward a detector. In a preferred construction, the system may optionally include a concentrating element disposed upstream of the detector if needed to compensate for the dithering action by redirecting the return light focused by the collection element back onto the detector.

Additional aspects and advantages of this invention will be apparent from the following detailed description of preferred embodiments, which proceeds with reference to the accompanying drawings.

BRIEF DESCRIPTION OF THE DRAWINGS

FIGS. 1 and 2 are schematic top plan views illustrating a scanning system according to a first embodiment, FIG. 1 illustrating the scan pattern produced when the dithering action is non-active and FIG. 2 illustrating the scan pattern when the dithering action is active;

DETAILED DESCRIPTION OF PREFERRED EMBODIMENTS

Figure 3:
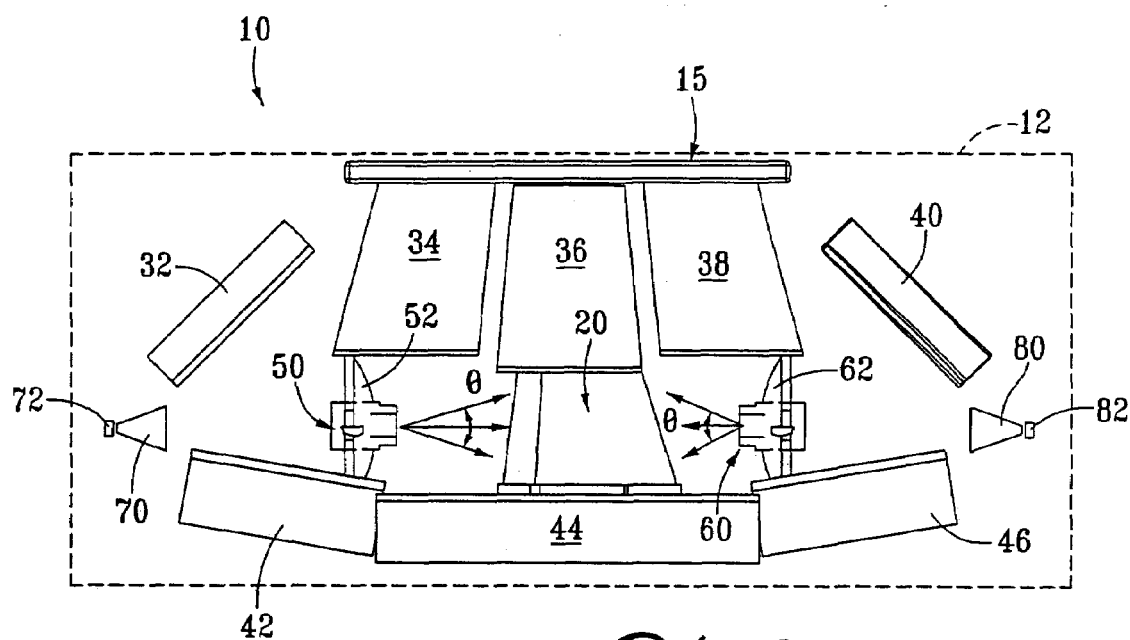
FIG. 3 is a schematic rear side view of the system of FIG. 2.
Figure 4:
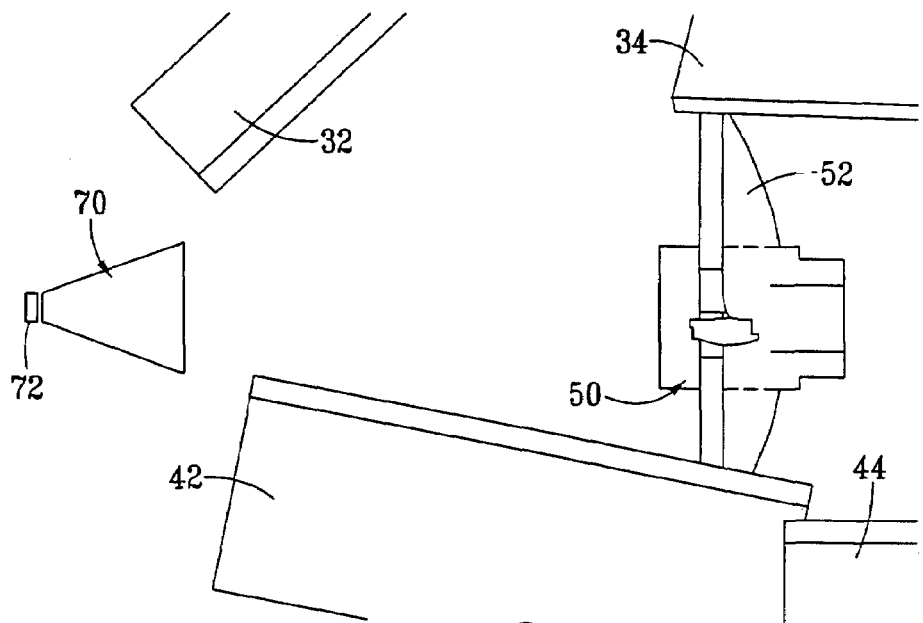
FIG. 4 is a detailed schematic side view of the dithering mechanism of the system of FIG. 2.

Preferred embodiments will now be described with reference to the drawings. To facilitate description, any reference numeral representing an element in one figure will represent the same element in any other figure.

FIGS. 1–6 illustrate a first embodiment in which a scanning system 10 provides a dense scan pattern out through a scan window 15 (FIG. 3). FIGS. 1–6 illustrate an embodiment of a single window scanner system 10. The scanner 10 may be installed in a counter with the window oriented in a horizontal position, or the scanner may be side-mounted to orient the window 15 in a vertical or inclined plane. The scan system 10 may also be applied to multi-window applications as will be described with reference to other figures.

The scan system 10 would typically be mounted in a housing indicated graphically by dashed line 12 in FIG. 3, the housing containing and protecting the internal components. The scan pattern is generated by directing a reading beam 51 from beam generator 50 and a reading beam 61 from scan generator 60. The beams 51, 61 are directed onto the rotating facet wheel 20 from opposite sides, the facet wheel 20 scanning the beams across pattern mirrors 32, 34, 36, 38, 40 which reflect the scanned beams downward onto secondary pattern mirrors 42, 44, 46 which in turn reflect the scan beams upward and out the window 15 and into the scan volume creating the scan pattern 23 illustrated in FIG. 1. The facet wheel 20 is shown as having three facets 20a, 20b, 20c, but the facet wheel 20 may be provided with any suitable number of facets depending upon the design of the scanning system.

Specifically, the beam 51 is scanned across the primary pattern mirror 32 which reflects the beam downward onto secondary pattern mirror 42, the beam 51 is scanned across the primary pattern mirror 34 which reflects the beam downward onto secondary pattern mirror 44, the beam 51 is scanned across the primary pattern mirror 36 which reflects the beam downward onto secondary pattern mirror 44, and the beam 51 is scanned across the primary pattern mirror 38 which reflects the beam downward onto secondary pattern mirror 44. In similar fashion, the beam 61 is scanned across the primary pattern mirror 34 which reflects the beam downward onto secondary pattern mirror 44, the beam 61 is scanned across the primary pattern mirror 36 which reflects the beam downward onto secondary pattern mirror 44, the beam 61 is scanned across the primary pattern mirror 38 which reflects the beam downward onto secondary pattern mirror 44, and the beam 61 is scanned across the primary pattern mirror 40 which reflects the beam downward onto secondary pattern mirror 46. Thus as illustrated, with each of the facets 20a, 20b, 20c disposed at a different angle, the pattern 23 of FIG. 1 is generated.

Figure 5:
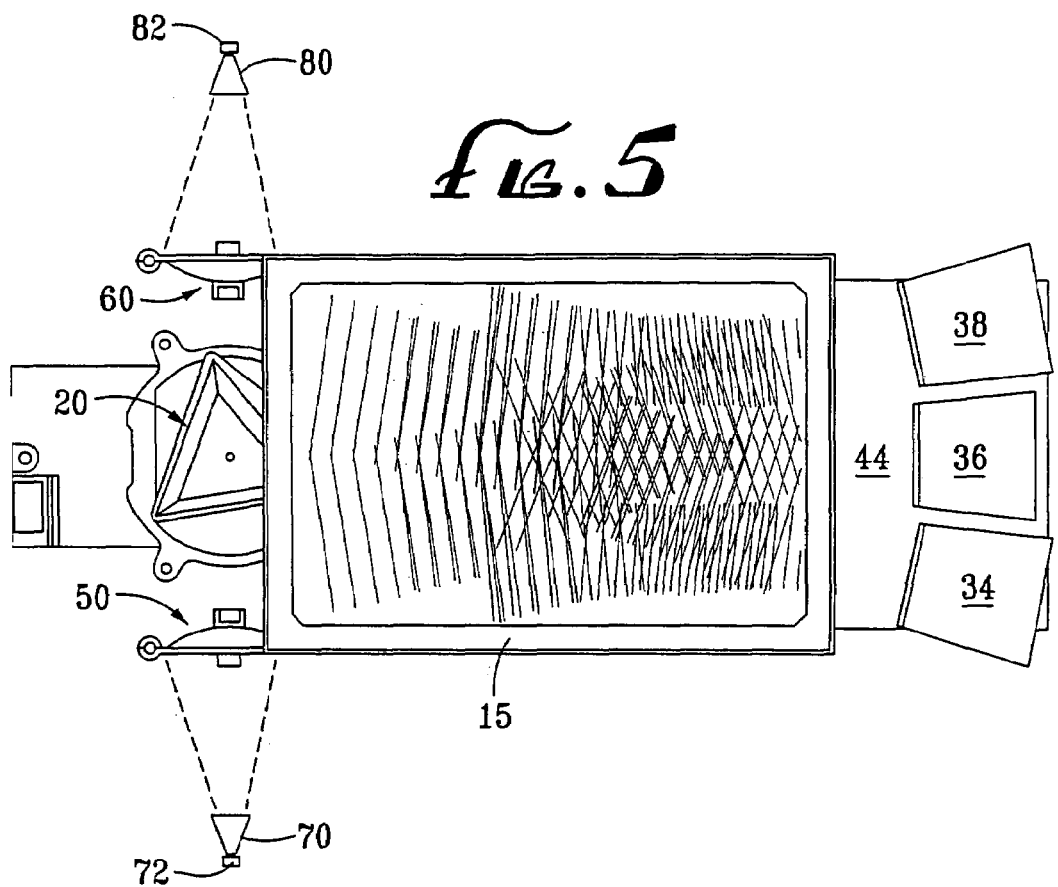
FIG. 5 is a schematic top view of the scanner of FIG. 2 illustrating the scan pattern produced solely by the rear pattern mirrors.
Figure 6:
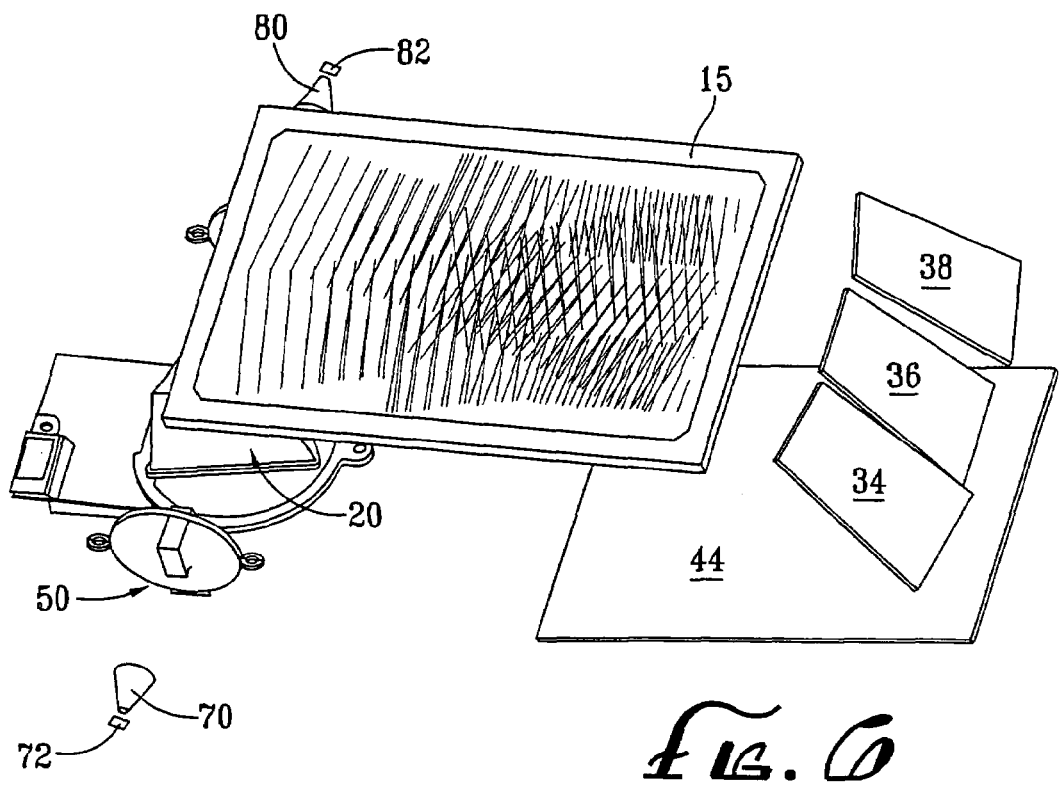
FIG. 6 is a schematic perspective view of the scanner of FIG. 2 illustrating the scan pattern produced solely by the rear pattern mirrors.

The beam generators 50, 60 are provided with an internal dithering mechanism whereby the reading beams 51, 61 exiting the beam generators are dithered or pivoted over an angle θ in a plane generally parallel to the axis of rotation of the facet wheel 20 thus striking the facets of the polygon mirror 15. This dithering of the beams 51, 61 prior to being scanned by the facets of the facet wheel 20 creates a greater variation in scan line coverage. FIG. 1 illustrates a scan pattern 23 produced when the dithering mechanisms of the beam generators 50, 60 are inactive and FIG. 2 illustrates a scan pattern 25 produced when the beam generators 50, 60 are active. FIGS. 5 and 6 illustrate a portion of the scan pattern 25 generated only by the pattern mirrors 34, 36, 38 and 44.

Figure 13:
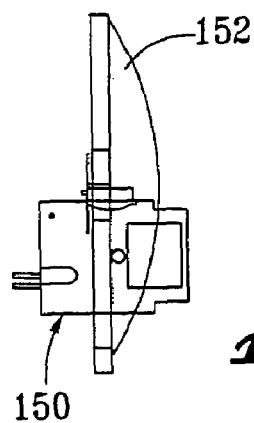
FIG. 13 is a side view of a beam generator mechanism for use in the embodiment of FIG. 4 in a preferred eccentric position within the collection lens.

Return light from the beams which is reflected/refracted off an object is retro-directionally collected, reflecting off the scan facets 20a, 20b, 20c and focused by collection lenses 52, 62 onto respective detectors 72, 82. The beam generator 50 is assembled and positioned within collection lens 52 and beam generator 60 is assembled and positioned within collection lens 62. The beam generators 50, 60 may be concentrically positioned within the collection lenses 52, 62 as illustrated in FIGS. 1–4 or may be eccentrically positioned as shown in the embodiment of FIG. 13 described below. Other types of collection systems other than lenses may be used such as collection mirrors or holographic elements.

Figure 8:
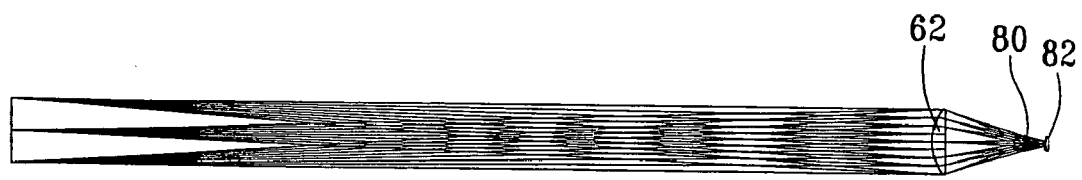

When the dithering mechanisms of the beam generators 50, 60 are inactive, the collection lenses 52, 62 directly focus the return light onto the respective detectors 72, 82 in an entirely retrodirective system. However when the dithering mechanisms of the beam generators 50, 60 are dithering, the position of the focused spot of the return light varies. In order to compensate for this variation, redirecting cones 70, 80 are positioned in front of the respective detectors 72, 82. The cones 70, 80 have inner walls which may or may not be reflective/mirrored, such that return light which is off-axis from the detector is redirected onto the detector. Details of the operation of the cones and collection lens are illustrated in FIGS. 8–9 wherein despite the varying axial direction of the dithered outgoing beam, the return light is focused by the collection lens 62 and redirected by the cone 80 onto the detector.

A preferred construction for the cone 80 is essentially a small megaphone-shaped element formed from molded acrylic, typically transparent optical plastic. By designing the cone 80 with a proper angle of incidence relative to the incoming cone of light (elsewhere herein referred to as a spot or waist) from the collection lens, the inner surface/wall of the cone is reflective even though the acrylic material is transparent. The process is similar to the reflective function of the inner wall of a fiber optic cable.

Figure 7:
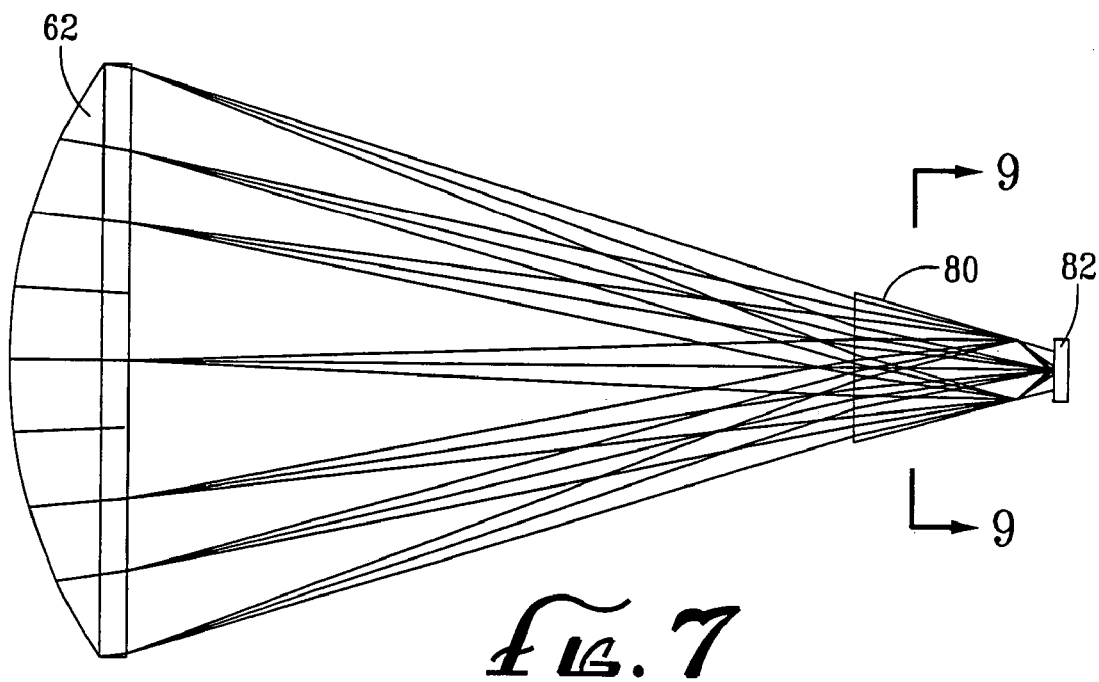
FIGS. 7 and 8 are diagrams illustrating collection operation of one of the collection lens systems of FIG. 2.
Figure 9:
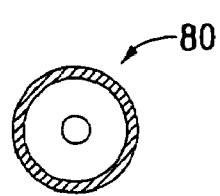
FIG. 9 is a cross section of the cone of FIG. 7.
Figure 10:
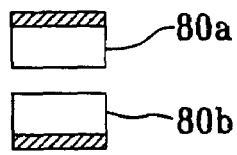
FIG. 10 is a cross section for an alternate redirecting mechanism for the cone of FIG. 7.
Figure 11:
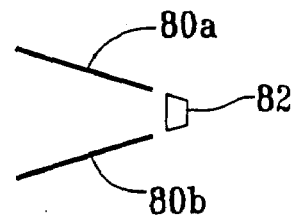
FIG. 11 is a side view of the alternative configuration mechanism of FIG. 10.

FIG. 9 is a cross section of the cone 80 of FIG. 7. The cone 80 may be conical in shape for providing for redirection of the focused spot toward the detector 82 for the spot being off axis in any direction. Since the dithering action is along a single plane (i.e. vertical with respect to the view of FIG. 5), the return focused spot should be offset only along the vertical axis. Thus the cone may be replaced with redirecting plates such as mirrors 80a, 80b shown in FIGS. 10–11, the mirrors 80a, 80b being angularly disposed to redirect the off-axis focused spot onto the detector 82.

Figure 9A:
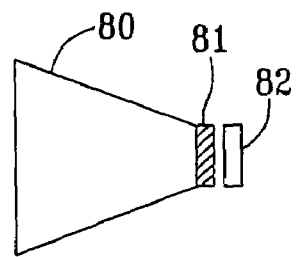
FIG. 9A is a side view of a redirecting cone and detector and including a filter.

The systems may preferably be provided with band pass filters in the collection path upstream of each of the detectors in any of the embodiments. FIG. 9A illustrates a preferred location for a band pass filter 81 attached to the small end of the redirecting cone 80 adjacent the detector 82. Alternately, the band pass filter may be attached to the larger end of the cone 80. In another configuration, the filter may be attached or applied as a coating on the surface of the detector 82 or the collection lens 62 (see FIG. 7) or separately mounted at a suitable position in the collection path upstream of the detector 82.

The system may be designed such that the beam redirecting elements 70, 80 are not required. Depending on the actual system configuration, the spot of return light (or an adequate portion thereof focused by the collection element may fall directly onto the detector without requiring redirecting. As disclosed in U.S. Pat. No. 6,056,198, hereby incorporated by reference, it may even be advantageous for the focused spot to not entirely fall on the detector.

Figure 12:
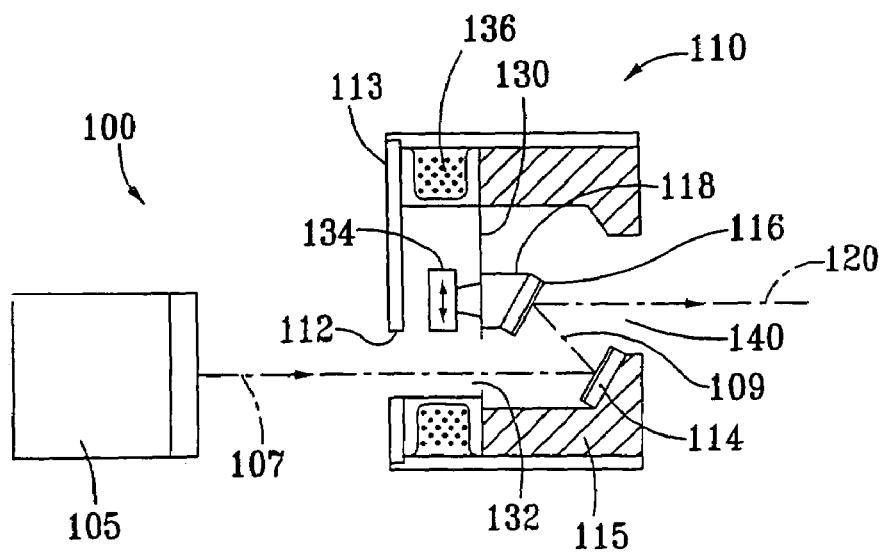
FIG. 12 is a detailed view of a beam generator mechanism of FIG. 4 in partial cross section.

Each of the beam generators 50, 60 may comprise a device which can accept an input light beam and cause it to be scanned so that the scanned beam emerges from it traveling generally in the same direction as the light that entered it. FIG. 12 illustrates a suitable design for such a beam generator including a dithering mechanism adapted from a device disclosed in U.S. Pat. No. 5,596,442. The beam generator 100 illustrated in FIG. 12 includes a light source 105 such as a visible laser diode module, VLDM, and a beam dithering mechanism 110. The beam dithering mechanism 110 makes it possible to linearly arrange a light source 105 with the scan device 110 in line with outgoing beam 120 in a compact construction.

In the operation of the beam generator 110, a light beam 107 from light source 105 enters aperture 112 in the housing 113 and passes through an opening 132 in suspension 130 whereupon the beam is reflected by a first fixed mirror 114. After reflection by mirror 114, the beam travels along path 109 and is again reflected by a second moveable mirror 116 and emerges along path 120 from the device passing through aperture 140. The input beam 107 is generally parallel to and moves in the same direction as the output beam path 120 except that beam is scanning about that direction.

Scanning is achieved when magnetic core 134, attached to flexible suspension 130 (i.e., a flat spring) is set in motion by applying alternating current to coil 136 and moveable mirror 116 participates in the motion of core 134 thereby causing outgoing beam 120 to be scanned.

The movable mirror 116 is shown mounted on a wedge 118 and stationary mirror 114 is fixed to the body 115 of the device at an angle so that the reflective surfaces of both mirrors 114 and 116 face each other and are parallel. In an alternate configuration, the device may be operated in reverse by first reflecting an input beam from the moveable mirror 116 in which case the output beam 120 would then emerge from aperture 140 after reflection from fixed mirror 114.

Figure 14:
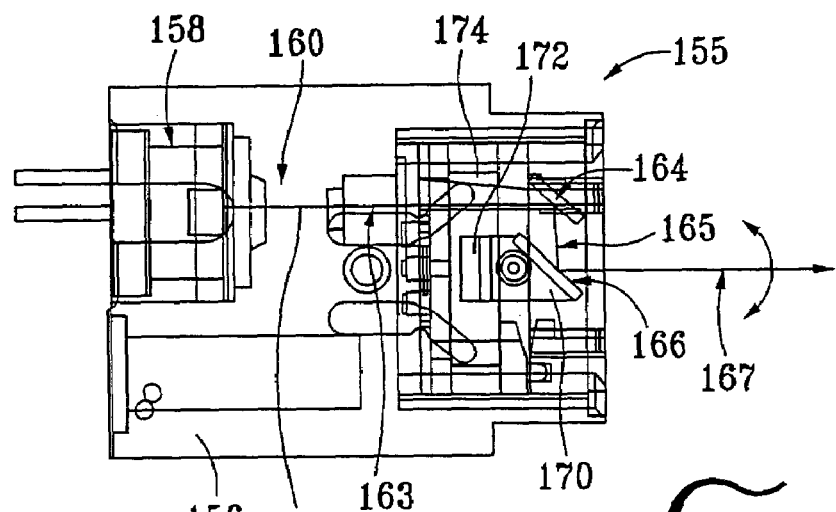
FIG. 14 is a detailed view of the beam generator of FIG. 13 in partial cross-section.
Figure 15:
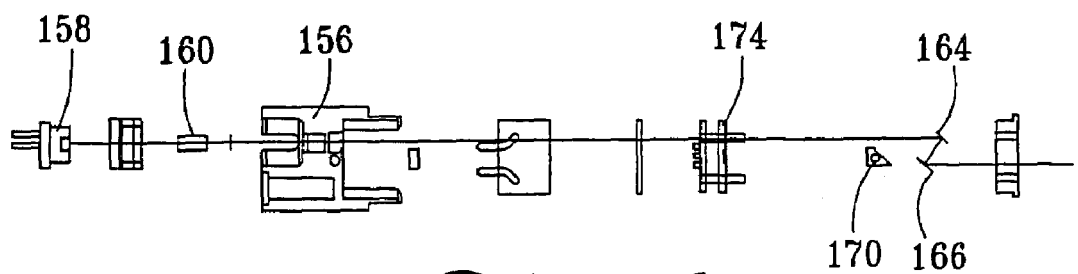
FIG. 15 is an exploded view of the beam generator of FIG. 14.

FIGS. 13–15 illustrate a preferred beam generator 150 suitable for use in the various embodiments described herein. The beam generator 150 is disposed eccentrically or offset from the center of the collection lens 152. The beam generator 150 includes a housing 156 into which the VLDM is mounted. The lens assembly 160 is also mounted within the housing 156 in front of the VLDM 158 for focusing the laser beam 161 generated by the VLDM 158. The beam 161 is directed along a first path 163, which is generally parallel to the axis of the collection lens 152, toward a routing mirror 164 which is disposed at a 45° angle thereby reflecting the beam 161 by 90° along a second path 165 and onto the dithering mirror 166. The dithering mirror 166 then reflects the beam 161 along an outgoing path 167.

The dithering mirror 166 is mounted on a pivoting mirror mount 170. The mirror mount 170 has a magnet 172 which is driven by a stationary coil 174. Alternately, any suitable dithering drive mechanism, such as for example the flexure-based mechanism described in U.S. application Ser. No. 09/318,499 filed May 25, 1999, hereby incorporated by reference, may be employed.

Figure 16:
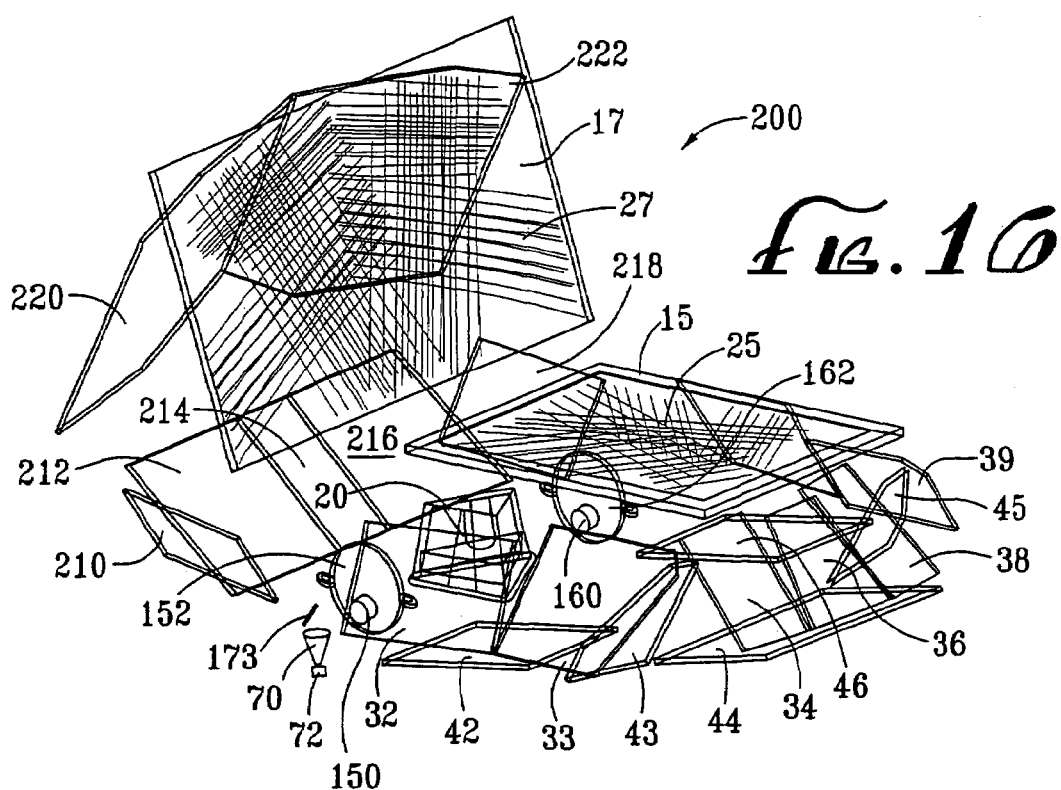
FIG. 16 is a schematic perspective view of a multi-window scanner system embodiment.
Figure 17:
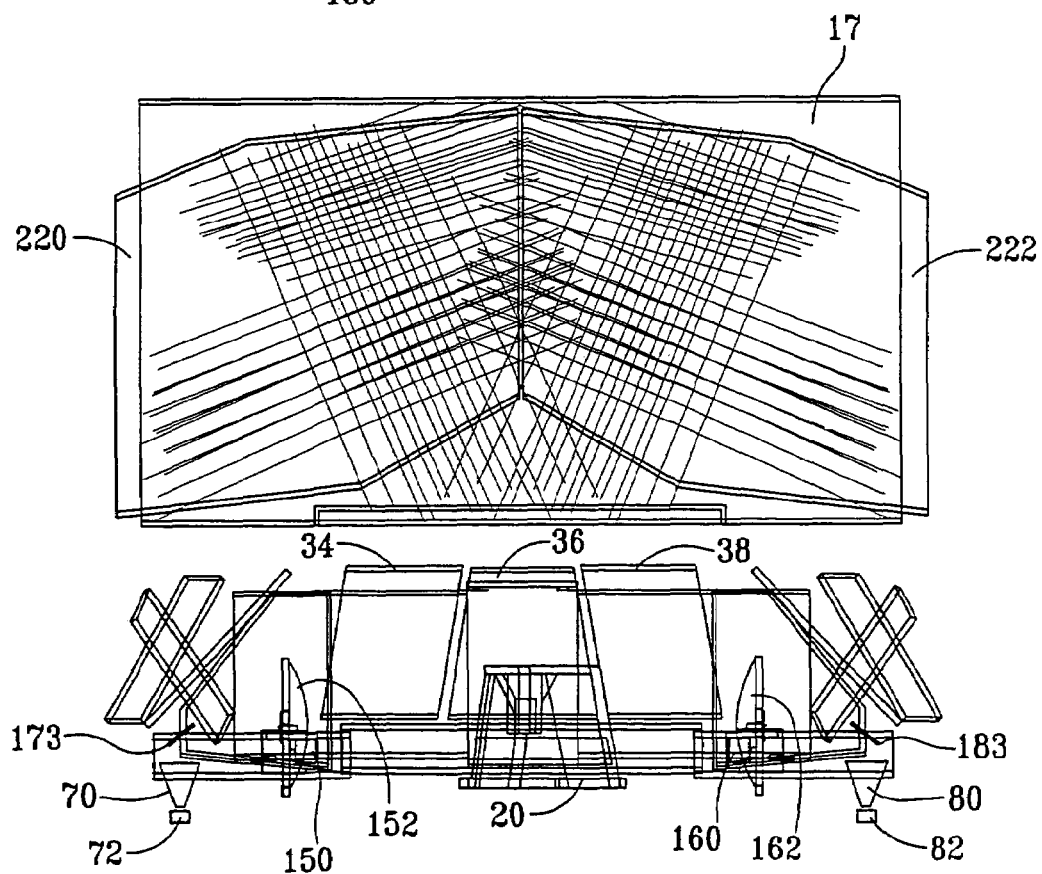
FIG. 17 is a schematic rear side view of the system of FIG. 16.
Figure 18:
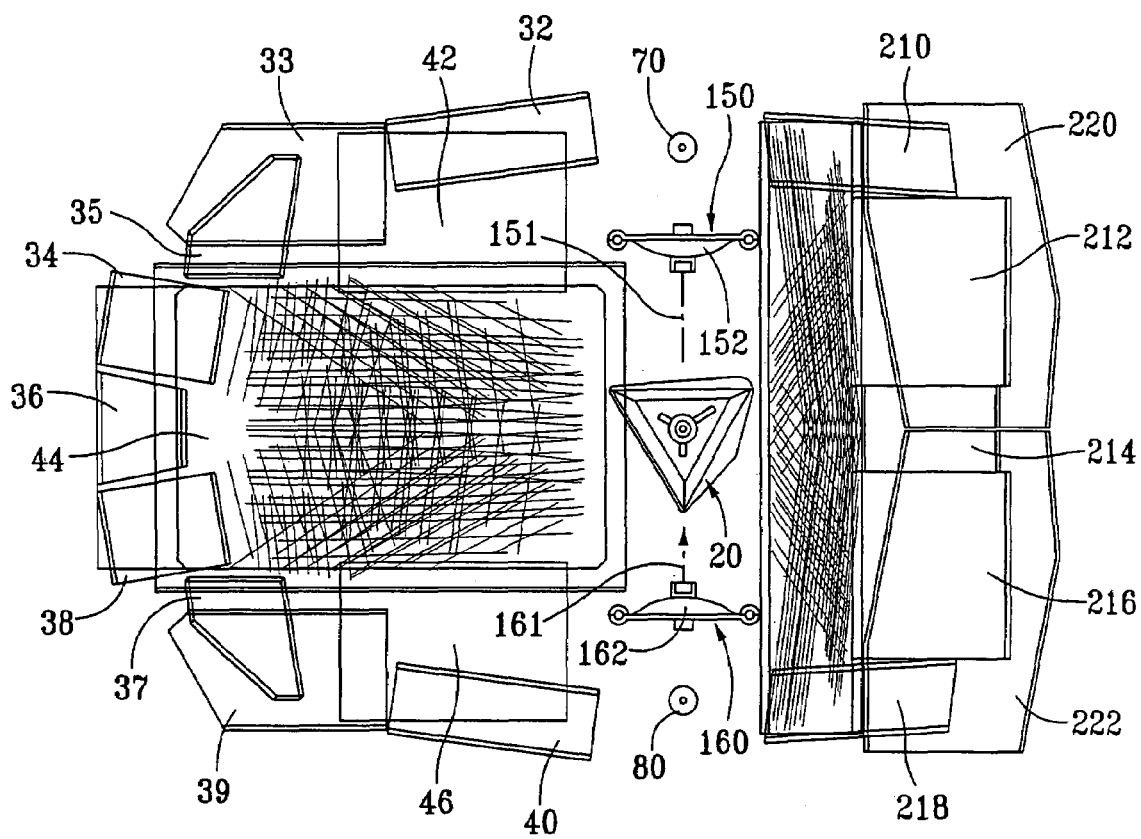
FIG. 18 is a schematic top plan view of the system of FIG. 16.

The scanning system 10 of FIGS. 1–6 only illustrates a single window configuration. However the dual beam design with the facet wheel disposed on one side of the window and the beams directed from the sides of the scanner rather than the end results in much of the beams being scanned to the left as viewed in FIG. 1 and therefore being unused. As shown in FIGS. 16–18, this arrangement may be particularly suited to a multi-window scanner, the second window being arranged in a more vertical plane as illustrated in FIGS. 16–18. Alternately, the scanner may have a second window and set of pattern mirrors in a mirror image to the window 15 and mirrors 32–46 to the left of the facet wheel 20 relative to the view in FIG. 1. In such a configuration, a single large window may be practical.

FIGS. 16–18 illustrate a multi-window scanner including as the bottom or horizontal section the scanning system 10 of FIGS. 1–6. For convenience, like elements in these figures bear the same element numerals as in the previous embodiments. The scanner 200 is similar to the Magellan SL® scanner available from PSC Inc. of Eugene, Oreg. except for the beam generating mechanisms 150, 160 and collection elements 70, 80 and certain other aspects described herein. The beam generating mechanisms 150, 160 each generates a dithering scan beam, 151, 161 as described in the previous embodiments, and direct the dithered beams 151, 161 onto the facet wheel 20. As it rotates, the facet wheel 20 scans the dithered beams 151, 161 across the pattern mirrors.

The scanner 200 includes a horizontal window 15 and a vertical window 17 with complex scan patterns 25, 27 of intersecting scan lines being generated and directed into the scan volume. The lower section beneath the horizontal window 15 has a set of pattern mirrors including a first set of primary mirrors 32, 33, 34, 36, 38, 39, 40 over which the beam is scanned by the facet wheel 20. The first set of primary mirrors 32–40 reflect the scanned beam downward to the first set of secondary mirrors 42, 43, 44, 45, 46 which in turn reflect the scan lines upward through the window 15 and into the scan volume.

The facet wheel 20 also directs dithered beams across a second set of primary mirrors 210, 212, 214, 216, 218 which in turn reflect the beams upward across a second set of secondary mirrors 220, 222 which then reflect the dithered beams out the vertical window 17.

As shown in FIGS. 16–17, the beam generators 150, 160 are disposed eccentrically within the collection lenses 152, 162 in similar fashion to the beam generator system illustrated in FIG. 13 and previously described. Details and descriptions in the previous embodiments of FIGS. 7–11 may be applied to the collection lenses 152, 162 and cones 70, 80 and details and descriptions in the previous embodiments of FIGS. 12–15 may be applied to the beam generators 150, 160 and collection lenses 152, 162.

The return light focused by the collection lens 152 is reflected by a fold mirror 173 downwardly into cone 70 which directs off-axis return light spot(s) onto detector 72 and the return light focused by the collection lens 162 is reflected by a fold mirror 183 downwardly into cone 80 which directs off-axis return light spot(s) onto detector 82.

Figure 19:
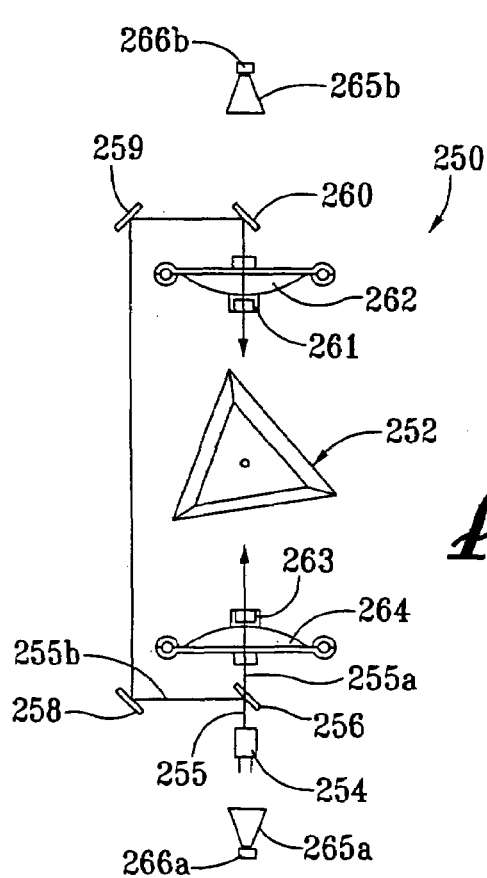
FIG. 19 is a diagram of an alternate multi-beam generation system.

In addition, though the scanner 10 of FIGS. 1–6 and the scanner 200 of FIGS. 16–18 are shown with multiple laser sources or VLDMs, other types of beam generation systems may be employed such as disclosed in U.S. Pat. No. 5,475,207 hereby incorporated by reference. FIG. 19 illustrates one example of a multibeam system 250 usable in these embodiments, the multiple beams being generated by a single laser source. The system 250 employs a light source such as a VLDM 254 generating a laser beam 255 directed toward a beam splitter 256. The beam splitter 256 splits the beam 255 into first reading beam 255a and second reading beam 255b. The reading beam 255a which passes through the beam splitter 256 passes into beam dithering mechanism 263 which dithers the beam 255a perpendicularly into the page as viewed in the figure and onto the facet wheel 252. The facet wheel 252 scans the dithered beam off of pattern mirrors in similar fashion as in previous embodiments. Return light is retrodirectively collected off the facet wheel and is focused by collection lens 264 onto detector 266a. Off-axis return light spot is redirected by redirecting element 265a.

In similar fashion, the reading beam 255b which is reflected by the beam splitter 256 is directed to a first routing mirror 258, which in turn reflects the beam toward second routing mirror 259, which then reflects the beam toward third routing mirror 260. The beam 255b is thereby directed into beam dithering mechanism 261 which dithers the beam 255b perpendicularly into the page as viewed in the figure and onto the facet wheel 252. The facet wheel 252 scans the dithered beam off of pattern mirrors in similar fashion as in previous embodiments. Return light is retrodirectively collected off the facet wheel 252 and is focused by collection lens 262 onto detector 266b. Off-axis return light spot is redirected by redirecting element 265b.

Figure 20:
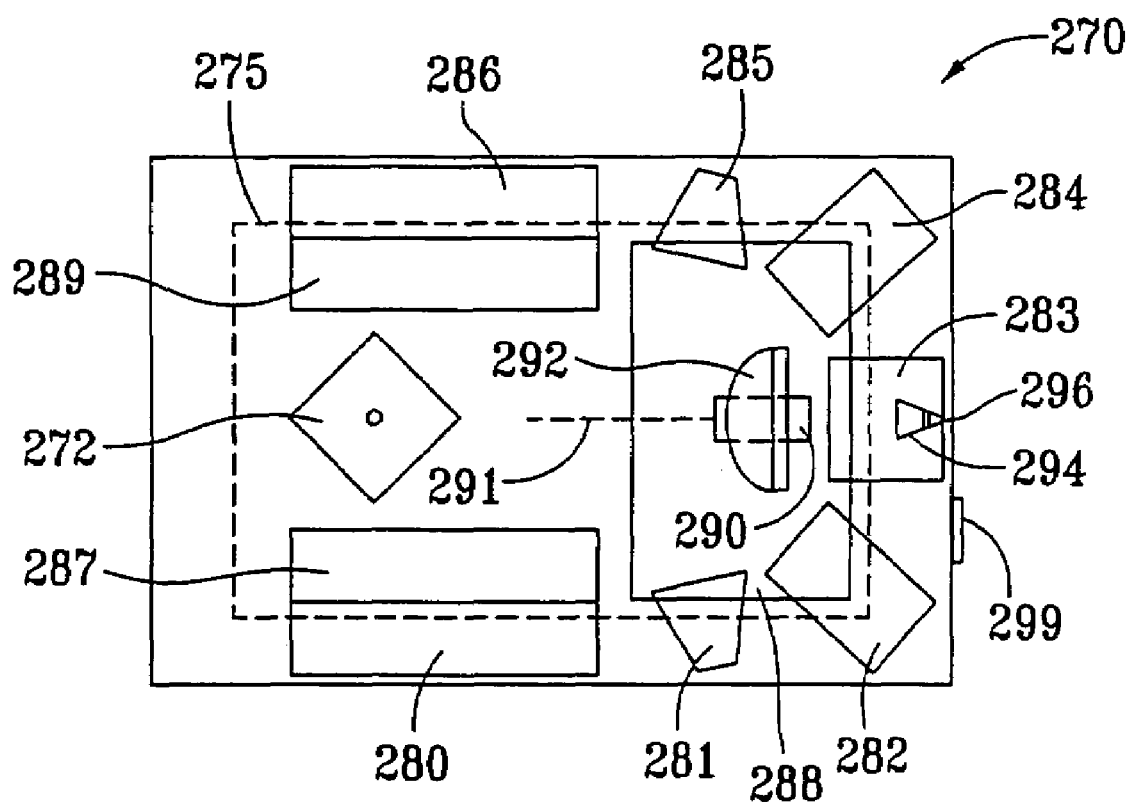
FIG. 20 is a schematic top plan view of an alternate scanning system.

The previous embodiments illustrate various multibeam systems, FIG. 20 illustrates a single beam system 270 usable for example in the HS 1250, VS 1000 and VS 1200 model scanners available from PSC Inc. of Eugene OR. In the scanner 270, the facet wheel 272 is located more centrally below the scan window 275 (illustrated in dashed lines). Similar to previous embodiments, a beam generator 290 is mounted within a collection lens 292. The beam generator 290 produces a dithered beam 291 (dithered over an angle perpendicular to the page) and directs the dithered beam 291 onto the facet wheel 272. The facet wheel 272 scans the dithered beam 291 across a set of primary mirrors 280, 281, 282, 283, 284, 285, 286 which in turn reflect the dithered beam downwardly onto secondary mirrors 287, 288, 289. The secondary mirrors 287, 288, 289 then reflect the dithered beam upwardly and out through the window 275. Generally the side of the scanner 270 containing the mirrors 282, 283, 284 would be oriented adjacent the checker to enable the largest concentration of scan lines to be directed toward a most likely position for the checker to position the items bearing bar codes. Return light reflected off an object scanned is returned via a retrodirective path and is collected/focused by collection lens 292 toward detector 296. Off-axis light is redirected onto the detector 296 by the redirecting element 294 as described in previous embodiment above.

Figure 21:
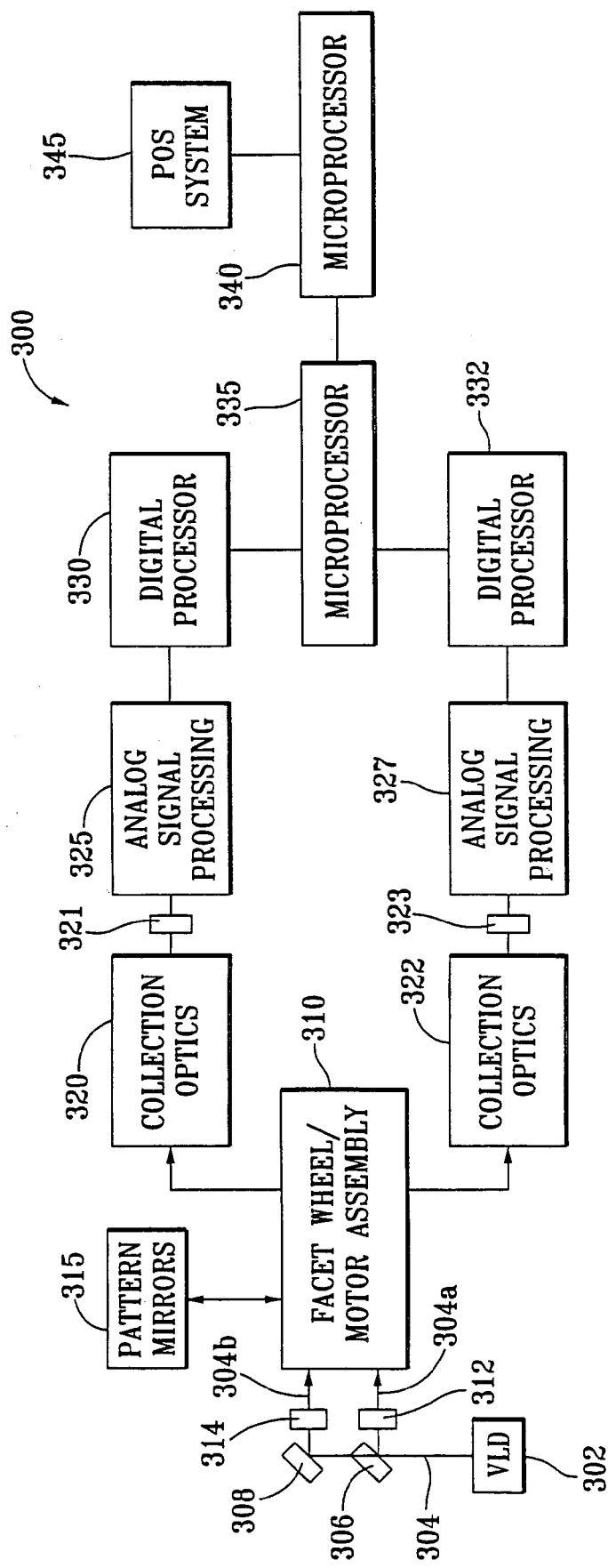
FIG. 21 is a schematic illustrating a processing method according to a first embodiment.
Figure 22:
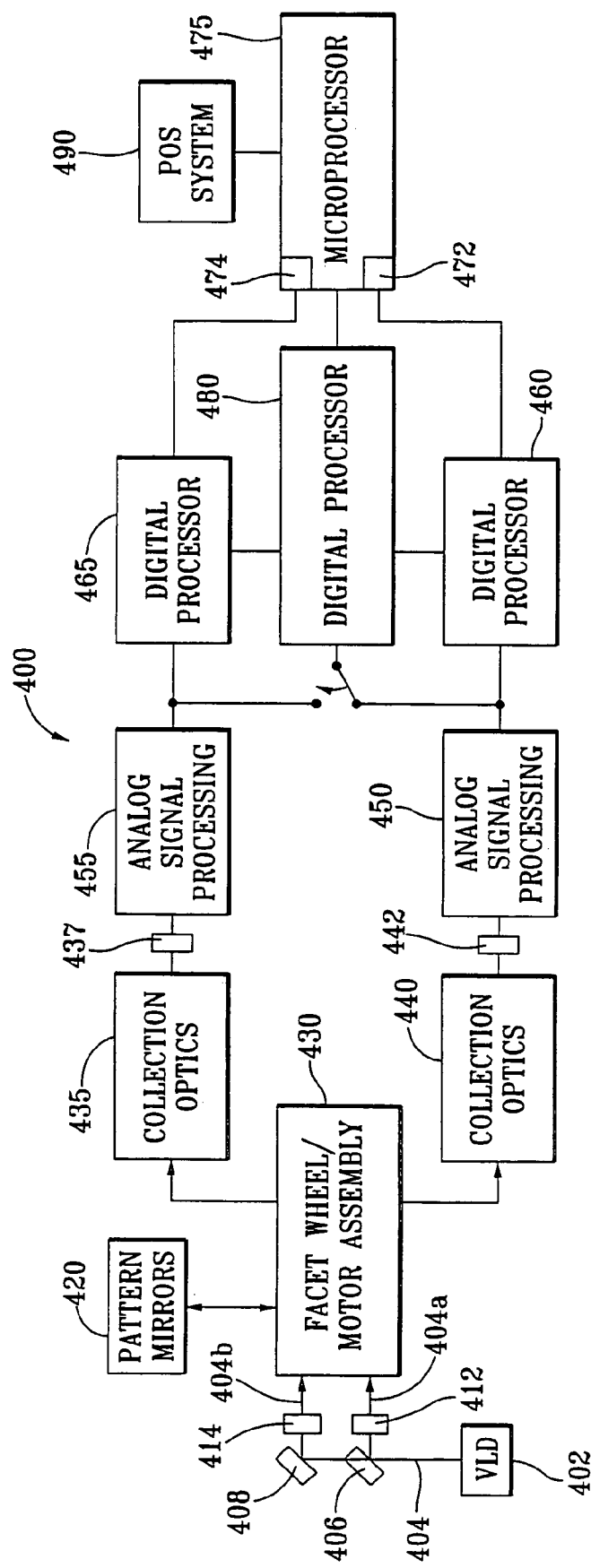
FIG. 22 is a schematic illustrating a processing method according to a second embodiment.
Figure 23:
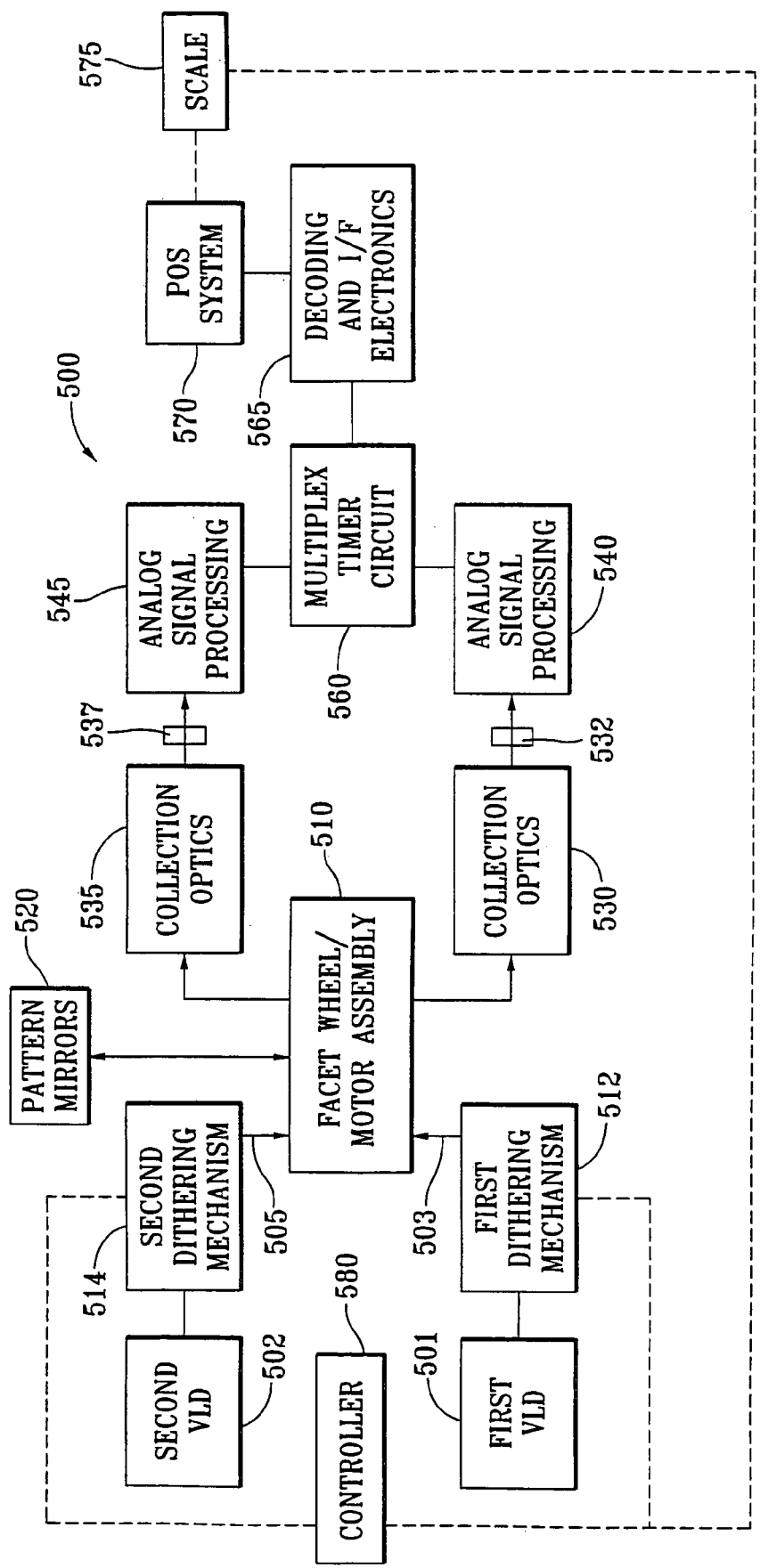
FIG. 23 is a schematic illustrating a processing method according to a third embodiment.

In either the scanner 10 of FIGS. 1–6 or the scanner 200 of FIGS. 16–18, or the scanner 250 of FIG. 19, multiple scan beams are simultaneously generated and employed thus creating a dense scan coverage. There are several methods for handling multiple signals such as described in U.S. Pat. No. 5,475,207 hereby incorporated by reference. FIGS. 21–23 illustrate several schemes for processing the multiple signals from the dual collection embodiments described above.

FIG. 21 illustrates a system 300 in which a single laser diode 302 produces an optical beam 304 onto a beam splitter 306. The beam splitter 306 divides the beam reflecting a portion of the beam, first reading 304a, onto the facet wheel 310 and transmitting a portion of the beam, second reading 304b, which is folded by a fold mirror 308 and directed onto the facet wheel 310. A first beam dithering mechanism 312 is positioned in the path of the first reading beam 304a upstream of the facet wheel 310 and a second beam dithering mechanism 314 is positioned in the path of the second reading beam 304b upstream of the facet wheel 310. The dithered reading beams 304a and 304b are scanned across pattern mirrors 315. Return signal is retrodirectionally collected off the polygon mirror 310 with separate signals collected by collection optics 320/322 onto detectors 321, 323. The redirecting cones and band pass filters are not illustrated in this figure. In the first processing channel or circuit, the light collected at detector 321 from reading beam 304b is processed by an analog signal processor 325 and then sent to the digital signal processor 330. Similarly, return signal collected by detector 323 from the reading beam 304a is processed by an analog signal processor 327 and then converted by digital processor 332.

The processed raw data from both digital processors 330, 332 is then input into a first microprocessor 335 where the signals are analyzed and processed together. This common processing allows for enhanced efficiency and scanning advantages. For example, a partial bar code scanned by a scan line generated from the upper reading beam 304b and collection optics 320 may be stitched together with a partial bar code scanned by a scan line generated from the bottom reading beam 304a and collection optics 322 to achieve a complete scan. A second microprocessor 340, which may be separate from or included within the first microprocessor 335, may optionally integrate data input from a weigh scale 197. Once processed, data from the processor 340 is output to an application system illustrated as the point of sale system 345. Suitable methods for assembling optical code information from partially scanned label segments are disclosed in U.S. Pat. No. 5,493,108 hereby incorporated by reference.

FIG. 22 illustrates another scanning system 400 with processing circuit schematics suitable for use in embodiments illustrated above. In the system 400, a laser diode 402 produces an optical beam 404 which is split by a beam splitter 406 reflecting a portion of the beam produce a first reading beam 404a and transmitting a second portion to produce a second reading beam 404b. The first reading beam 404a is directed through a first beam dithering mechanism 412 which projects a dithered beam 404a onto the polygon mirror 430. The second reading beam 404b is reflected by a fold mirror 408 and directed through a second beam dithering mechanism 414 which projects a dithered reading beam 404b onto the polygon mirror 430. The polygon mirror 430 scans the dithered reading beams 404a, 404b across a plurality of pattern mirrors 420 to produce a desired scan pattern. Return signal is collected retrodirectionally by collection optics 435, 440 as in the previous embodiment such that return signal originating from reading beam 404a is collected onto a first detector 442 and return signal originating from upper reading beam 404b is collected onto second detector 437. The redirecting cones and band pass filters are not illustrated in this figure.

The separate collection optics permit the simultaneous scanning via the first and second reading beams 404a, 404b through the same window. Separate analog signal processors 450, 455 are provided for simultaneously processing the analog signals from the respective photodiodes 442, 437. Each signal is then converted and processed in a digital processor 460, 465 and then input into the microprocessor 475 for final processing and transmittal to the point of sale system 490.

FIG. 22 also illustrates an alternate processing method wherein the signals from the analog signal processors 460, 465 may be routed to a single digital processor 480, multiplexed by a switching mechanism 470. Alternately, a combination of the above two embodiments of FIG. 22 may be used. Buffers may be used in the above embodiments. For example, optional buffers 472, 474 may be provided to assist processor 475.

FIG. 23 is a flow chart of another light scanning and collecting processing scheme 500. A first (bottom) laser diode light source 501 and second (top) laser diode light source 502 generate light beams 503, 505. The first light beam 503 is directed into the first dithering mechanism 512 which dithers the beam 503 over an angle and onto a respective portion of the polygon mirror 510. The second light beam 505 is directed into the second dithering mechanism 514 which dithers the beam 505 over an angle and onto a respective portion of the polygon mirror 510. Scan beams from both the beams 503, 505 are reflected off the common polygon mirror 510 according to any of the previous embodiments. Return signal originating from bottom reading beam 503 is collected (primarily) by bottom collection optics 530 and detected by detector 532 and return signal originating from top reading beam 505 is collected (primarily) by upper collection optics 535 and detected by detector 537. The redirecting cones and band pass filters are not illustrated in this figure. The signals from the respective detectors 532, 537 are processed in respective analog signal processing units 540, 545 and then input into a multiplex timer circuit 560 so that the bar code signals from the top and bottom may be successively combined and transmitted to the decoding I/F electronics unit 565. This common processing allows for enhanced efficiency and scanning advantages similar to the previous embodiment. Once processed, data from the processor 565 is output to the point of sale system 570.

The particular processing scheme will depend upon the state of processors and the configuration of the system. The processing scheme illustrated in FIG. 21, may be particularly suited for a configuration of FIGS. 1–6 or FIGS. 16–18 or in the other embodiments. In the system 300 each detector has its own signal processor, the bandwidth and gain can be optimized for each focusing zone. At any one time, there would be one data stream (corresponding to a bar code signal) for each signal processor 332, 330. Each data stream would come into the microprocessor 335 having been digitized and decoded in parallel. This system 500 having parallel collecting and processing channels/circuits advantageously permits, for any scan, all the zones to be decoded concurrently and does not require multiplexing between scans so snappiness is improved over the multiplex systems such as illustrated in FIG. 23.

The above examples illustrate two-beam systems, however the systems may accommodate more than two beams (for example three or more) such that return signals from two, three or more detectors are each digitized and decoded in parallel channels and then the preprocessed data streams are combined in a microprocessor. Additional microprocessor speed may be required if more data strings are added, but the optical system architecture may remain basically the same.

FIG. 23 also illustrates a controller 580 electrically connected to the dithering mechanisms 512, 514. By controlling the operation of the dithering mechanisms, the scan patterns generated by the system may be varied. In its simplest form, deactivating (i.e. turning off) the dithering mechanisms 512, 514 would generate one scan pattern, for example scan pattern 23 in FIG. 1 and activating (i.e. turning on) the dithering mechanisms 512, 514 would generate a second scan pattern, for example scan pattern 25 of FIG. 2.

The scanner system of the various embodiments may comprise a separate scale, but more preferred a combined scanner-scale, the scale being integrated into for example the horizontal window. In the system 500 of FIG. 23, a scale 575 is provided in communication with the POS system 570. The scale 575 may also send a signal to the controller 580 to activate/deactivate the dithering mechanism when the scale 575 detects an object being weighed. For example, when a produce product such as a bunch of bananas is placed on the scale to be weighed, the scale 575 may send a signal to the controller to activate the dithering mechanisms 512, 514 thus changing the scan operation to provide the more dense scan pattern.

In other applications, the controller 580 may provide more complicated control schemes. For example, by more slowly moving the dithering mechanisms, the scan patterns can be made to slowly move or migrate through the scan volume, essentially scanning the scan pattern. Alternately, the dithering mechanism may be controlled to incrementally move the scan mirrors thereby selectively controlling the position of the scan pattern. A feedback mechanism may be provided enabling the controller to select the type of control scheme (e.g. continuous high speed dithering, low speed dithering, incremental dithering, specific stationary dither mirror positioning) which achieves the most superior reading efficiency.

Further, though the dithering mechanism is described as dithering in a single plane over the angle θ in a plane parallel to the axis of rotation of the facet wheel, a dithering mechanism may be disposed to dither at some other angle, such as perpendicular to the facet wheel axis or alternately dither not just in one plane/dimension but in two dimensions. Dithering perpendicular to the facet wheel axis may permit the system to produce longer scan lines potentially enlarging scan volume. Such two dimensional or perpendicular dithering could also be controlled or otherwise selected via the controller 580.

The controller (either the same controller or a separate controller) may also provide for control of the motor rotating the facet wheel. Referring for example to the system 270 of FIG. 20, by stopping the facet wheel 272 at a desired location and activating the dithering mechanism 290, the system 270 may generate a single scan line (or other simplified scan pattern) which (1) could be selectively directed to a specific area of the scan volume or possibly to a separate exit window 299 in a side of the scanner or (2) directed along a specified path or otherwise optimized for a specialized function. One such specialized function may comprise a wakeup feature whereby in a "sleep mode" one or more of the following operations may be implemented:

the light source in the beam generator 290 is pulsed or operated at low power (thus conserving power or life of the laser diode), the facet wheel 272 is moved to a stationary position such that the dithered beam is directed toward a position in (or in front of) the scan volume where it is expected that an item to be presented will enter the scan volume (thus conserving power or life of the motor), the dithering mechanism in the beam generator is operated at low power or frequency.

When the detector 296 senses presence of an item, the system is powered up activating the motor rotating the facet wheel 272, switching the light source to standard power level, and activating the system data processing circuitry.

Thus the present invention has been set forth in the form of its preferred embodiments. It is nevertheless intended that modifications to the disclosed scanning systems may be made by those skilled in the art without altering the essential inventive concepts set forth herein.

It will be obvious to those having skill in the art that many changes may be made to the details of the above-described embodiments without departing from the underlying principles of the invention. The scope of the present invention should, therefore, be determined only by the following claims.

The invention claimed is:

1. A system comprising
a scanner-scale having a scanner, a horizontal window through which the scanner reads optical codes on items in a scan volume in front of the window, and a weigh scale integrated with the scanner and with the horizontal window;
a controller in communication with the weigh scale, wherein the controller is operative to change an optical code reading scan pattern produced by the scanner in response to detection of an object being weighed by the weigh scale.

2. A system for reading an item in a scan volume, comprising
a housing having at least one window;
a data reading system disposed in said housing and reading through said window an item in the scan volume;
a weigh scale incorporated into said housing;
a controller in communication with said weigh scale, wherein said controller changes an optical data capture reading function of the data reading system depending upon whether an object is detected as being weighed on said weigh scale.

3. A system for reading an item in a scan volume, comprising
a housing having at least one window;
a data reading system disposed in said housing and reading through said window an item in the scan volume;
a weigh scale incorporated into said housing; a controller in communication with said weigh scale, wherein said controller changes a reading function of the data reading system depending upon whether an object is detected as being weighed on said weigh scale,
wherein the data reading system comprises a primary scanning mechanism and a secondary scanning mechanism, both being operative for reading out through said window, wherein said controller changes a reading function by being operative to switch the data reading system between a first mode of operation wherein only the primary scanning mechanism is operative and a second mode of operation wherein both said primary scanning mechanism and said secondary scanning mechanism are operative.

4. A system according to claim 3 wherein upon detection of the object being weighed on said weigh scale said controller switches to the second mode of operation.

5. A system according to claim 3 wherein the data reading system comprises a laser scanner, wherein in the first mode of operation, the primary scanning mechanism generates first pattern of scan lines, wherein in the second mode of operation, the primary and secondary scanning mechanisms in combination generates a second pattern of scan lines of greater density than the first pattern.

6. A system for reading an item in a scan volume, comprising
a housing having at least one window;
a data reading system disposed in said housing and reading through said window an item in the scan volume;
a weigh scale incorporated into said housing;
a controller in communication with said weigh scale,
wherein said controller changes a reading function of the data reading system as to how the data reading system reads an optical code through said window depending upon whether an object is detected as being weighed on said weigh scale.

7. A system for reading items presented in a read volume, comprising
a housing;
an optical data reading system disposed in said housing;
a weigh scale incorporated into said housing;
a controller in communication with said weigh scale,
wherein upon detection that an object is being weighed on said weigh scale, the controller switches operation of the data reading system from a first reading density mode to a second higher density reading mode.

8. A system according to claim 7 wherein the data reading system comprises a laser scanner, wherein in the first mode of operation, the primary scanning mechanism generates first pattern of scan lines, wherein in the second mode of operation, the primary and secondary scanning mechanism in combination generate a second pattern of scan lines of greater density than the first pattern.

9. A system according to claim 7 wherein the data reading system comprises an optical laser scanner, wherein when operating in the second higher density reading mode, the laser scanner generates a higher density scan pattern than when operating in the first density reading mode.

* * * * *